(12) United States Patent
Nanba

(10) Patent No.: US 11,050,346 B2
(45) Date of Patent: Jun. 29, 2021

(54) POWER GENERATION DEVICE

(71) Applicant: Shozo Nanba, Kisarazu (JP)

(72) Inventor: Shozo Nanba, Kisarazu (JP)

(73) Assignee: BMC CO., LTD., Yokohama (JP)

( * ) Notice: Subject to any disclaimer, the term of this patent is extended or adjusted under 35 U.S.C. 154(b) by 7 days.

(21) Appl. No.: 16/492,650

(22) PCT Filed: Mar. 1, 2018

(86) PCT No.: PCT/JP2018/007745
§ 371 (c)(1),
(2) Date: Sep. 10, 2019

(87) PCT Pub. No.: WO2018/168489
PCT Pub. Date: Sep. 20, 2018

(65) Prior Publication Data
US 2020/0343813 A1    Oct. 29, 2020

(30) Foreign Application Priority Data
Mar. 14, 2017   (JP) ............................. JP2017-048330

(51) Int. Cl.
*H02M 3/00* (2006.01)
*H02M 3/07* (2006.01)
*H02N 11/00* (2006.01)

(52) U.S. Cl.
CPC .............. *H02M 3/07* (2013.01); *H02M 3/00* (2013.01); *H02N 11/002* (2013.01)

(58) Field of Classification Search
CPC ......... H02M 3/07; H02N 11/002; H03M 3/00
See application file for complete search history.

(56) References Cited

U.S. PATENT DOCUMENTS 4,297,629 A * 10/1981 Godard ............... H01M 10/441
                                                    320/117
10,197,619 B2 * 2/2019 Kawanaka ........... G01R 31/396

FOREIGN PATENT DOCUMENTS

JP    S56-141784 A    11/1981
JP    H0739138 A      2/1995
(Continued)

OTHER PUBLICATIONS

English translation of International Search Report of PCT/JP2018/007745 dated May 29, 2018.

*Primary Examiner* — Dinh T Le
(74) *Attorney, Agent, or Firm* — Muncy, Geissler, Olds & Lowe, P.C.

(57) ABSTRACT

A power generation device is characterized in that: charging and discharging circuits constituted by a first DC power supply and a second DC power supply each comprising a DC power supply are connected to a capacitor circuit that is constituted by one capacitor and the other capacitor each comprising a single capacitor or a plurality of capacitors; the configuration of the capacitor circuit can be switched to a first mode circuit or a second mode circuit by an operation switch, said first mode circuit storing charge in both capacitors from the charging circuit via a high-voltage relay, said second mode circuit storing charge in only the one capacitor; and the connection configuration of the capacitor circuit in which charge is stored is switched to a series connection by a switching switch driven by a switching driving power supply constituted by the DC power supply to reduce the combined capacitance of the capacitor circuit, thereby supplying the increased charge to the discharging circuit via the high-voltage relay.

6 Claims, 4 Drawing Sheets

(56) References Cited

FOREIGN PATENT DOCUMENTS

| | | | |
|---|---|---|---|
| JP | 2005278295 | A | 10/2005 |
| JP | 4789093 | B2 | 10/2011 |
| JP | 2012065434 | A | 3/2012 |
| JP | 2012-143121 | A | 7/2012 |

* cited by examiner

POWER GENERATION DEVICE

TECHNICAL FIELD

The present invention relates to power generation devices for obtaining electric energy from external energy by reducing the capacitance of charged capacitors with external energy such as natural energy.

BACKGROUND ART

A number of devices such as the "energy conversion method", "electrode plate drive device for electrostatic power generation" and "electrostatic power generation device" are known as capacitor type power generation devices and the like (for example, see Patent Document 1, Patent Document 2 and Patent Document 3). However, these devices, as well as any other related devices, apply the "energy conversion method" described in the Patent Document 1 to obtain electric energy by reducing the capacitance of capacitors accumulating electric charges with external energy such as wave power.

The method of reducing the capacitance of the capacitor includes, for example, a method of reducing the effective facing area of electrode plates, a method of increasing the distance between the electrode plates, a method of decreasing the dielectric constant of a dielectric between the electrode plates, and a combination thereof. All of the devices principally use the method of reducing the effective facing area of the electrode plates, the method of increasing the distance between the electrode plates, and the like.

PRIOR ART DOCUMENT

Patent Document

Patent Document 1: Japanese Patent Application Publication No. Sho 56-141784 (Energy conversion method)
Patent Document 2: Japanese Patent No. 4789093 (Electrode plate drive device for electrostatic power generation)
Patent Document 3: Japanese Patent Application Publication No. 2012-143121 (Electrostatic power generation device)

SUMMARY OF THE INVENTION

Problem to be Solved by the Invention

The electrode plate drive device for electrostatic power generation according to the Patent Document 2 is characterized in that the cathode electrode plate is rotated using hydraulic power. However, it has the following problems:

(1) A special processing step of covering an anode electrode plate with an insulator film is required. The prior art has a problem that the insulator film can be broken, and there are also challenges in terms of technology and cost.

(2) The anode electrode plate has to be installed in the electrolyte solution, and the cathode electrode plate has to be rotated in the electrolyte solution, which causes problems in upsizing of the device as well as the installation, operation, and the like of the device.

The electrostatic power generation device according to the Patent Document 3 is characterized in that the connection structure of the capacitor group accumulating electric charge is changed by external energy, and therefore the combined capacitance of the capacitor group is reduced. However, the following problems are encountered:

(1) Only one capacitor accumulates the electric charge, and then the one capacitor is connected in series to the other capacitor in which the electric charge is not accumulated. However, another operation mode is missing such that both capacitors are connected in parallel and accumulate the electric charge, and then one capacitor and the other capacitor in which the electric charge is accumulated are connected in series.

(2) When both capacitors accumulating the electric charge are connected in series, the terminal voltage of the capacitor group increases, which may damage the capacitor, the changeover switch, and the like.

Means for Solving the Problems

The present invention is to improve the electrostatic power generation device and the like in order to solve the above-mentioned problems. The present invention relates to a power generation device for obtaining electric energy from natural energy or other energy. The power generation device of a first aspect of the present invention is characterized by comprising:

(a) a capacitor circuit as a circuit for connecting two capacitors, one of the two capacitors comprising at least one capacitor and the other capacitor of the two capacitors comprising at least one capacitor;

(b) an operation switch capable of selectively charging the one capacitor and the other capacitor provided in the capacitor circuit;

(c) a changeover switch provided in the capacitor circuit and capable of switching in two directions of x and y;

(d) a relay provided in the capacitor circuit;

(e) a first DC power supply comprising a DC power supply for charging the one capacitor and the other capacitor provided in the capacitor circuit; and a second DC power supply for reserving increased electric charge from the capacitor circuit; and (f) a switching drive power supply comprising a DC power supply for operating the changeover switch and the relay provided in the capacitor circuit; and characterized by the following conditions:

(g) the one capacitor and the other capacitor can be charged by the DC power supply;

(h) a signal from the changeover switch is used as a control signal of the relay, and (i) the changeover switch is switched to the x-side to accumulate electric charge in the two capacitors via the relay and then to the y-side to connect the two capacitors in series, whereby a combined capacitance of the capacitor circuit is reduced, and the increased electric charge is discharged to the second DC power supply via the relay to obtain electric energy.

The power generation device of a second aspect of the present invention is the power generation device according to claim 1, wherein the operation switch is turned "OFF" to set the circuit to a second mode, the changeover switch is switched to the x-side to accumulate the electric charge in the both capacitors via the relay and then to the y-side to connect the both capacitors in series, whereby the combined capacitance of the capacitor circuit is reduced, and the increased electric charge is discharged to the second DC power source via the relay to obtain electric energy.

The power generation device of a third aspect of the present invention is the power generation device according to claim 1 and claim 2, characterized in that the voltage of the second DC power supply in a charging/discharging circuit comprising DC power supplies is set higher than the voltage of the first DC power supply and the capacitance of the one capacitor in the capacitor circuit is set larger than the capacitance of the other capacitor.

Assuming that the electric charge Q is accumulated in the capacitor, since the relationship between capacitor capacitance C and capacitor terminal voltage V is Q=CV, V=Q/C, when the electric charge Q is constant, an increase in the capacitor capacitance C causes a decrease in the capacitor terminal voltage V, and a decrease in the capacitor capacitance C causes an increase in the capacitor terminal voltage V.

When two sets of capacitors are connected in series, the combined capacitance of the capacitors decreases and the capacitor terminal voltage increases.

Moreover, the stored energy W in the capacitor is represented as W=(½) QV. When the electric charge Q is constant, the capacitor capacitance C is small, and the larger the capacitor terminal voltage V is, the larger the stored energy W is.

Furthermore, the optimum ratio of the DC voltages for the charging circuit Va and the discharging circuit Vb is set to Vb/Va=2.

In a case where the power generation device is configured as shown in FIG. 1, when the interlocking changeover switch actuated by the switching drive power supply is switched to the x-side, the capacitor circuit is brought into the state that one capacitor and the other capacitor are connected in parallel (first mode). As a result, electric charges are accumulated in both capacitors of the capacitor circuit via the three sets of high withstand voltage relays by the applied voltage of the first DC power supply.

In this state, when the changeover switch is switched to the opposite y-side, the capacitor circuit is brought into a series connection of one capacitor and the other capacitor, which is the same as one of the methods for reducing the capacitance of the capacitor where the distance between the electrode plates of the capacitor is increased.

The combined capacitance Cab when two sets of capacitors Ca and Cb are connected in series is: Cab=(Ca*Cb)/(Ca+Cb), and the combined capacitance Cab decreases.

At this time, since the electric charge of the capacitor circuit is constant, the voltage across the capacitor circuit becomes higher than the voltage applied to the second DC power supply, and the electric charge of the capacitor circuit is supplied to the second DC power supply side via the two sets of high withstand voltage relays.

Then, when the changeover switch is switched to the x-side again, electric charges are similarly accumulated in both capacitors of the capacitor circuit by the applied voltage of the first DC power supply.

Electrical energy is obtained on the second DC power supply side by the repeated cycles described above.

According to the second aspect of the present invention, the power generation device is characterized in that the operation switch is turned "OFF" to set the circuit to a second mode, the changeover switch is switched to the x-side to accumulate the electric charge in only one capacitor of the capacitor circuit and then to the y-side to connect the both capacitors in series, whereby the combined capacitance of the capacitor circuit is reduced, the increased electric charges are discharged to the second DC power source via the relays, and electric energy is obtained.

According to the third aspect of the present invention, the power generation efficiency can be maximized by doubling the voltage of the second DC power supply in the charging/discharging circuit constituted with the DC power supplies with respect to that of the first DC power supply. Furthermore, the component ratio for the capacitance of one capacitor Ca to that of the other capacitor Cb is set to 2:1 in the capacitor circuit, whereby a high-efficiency device can be achieved, and the terminal voltage of the capacitor in the discharging circuit can be lowered when the capacitor circuit is set in the series connection.

This power generation device is to obtain electric energy on the second DC power supply side by changing the connection structure of the capacitor circuit accumulating electric charge from the first DC power supply side and reducing the combined capacitance of the capacitor circuit.

In this case, electric energy can be obtained on the second DC power supply side in either way where both capacitors accumulate the electric charge and then the circuit is set to the series connection (first mode), or only one capacitor accumulates the electric charge and then the circuit is set to the series connection (second mode).

In the case where the electric charge is accumulated in both capacitors in the first mode, it is advantageous to have high electrical efficiency, whereas in the case of series connection, the voltage across the capacitor circuit is high, which may damage the capacitors. On the other hand, in the case where the electric charge is accumulated in only one capacitor in the second mode, the risk of capacitor damage can be effectively avoided.

Therefore, by providing the manual operation switch, the operation of the missing first mode is added, and both the first mode and the second mode ensure the operation of obtaining electric energy on the second DC power supply side, as well as the selection of the operation mode.

Furthermore, by providing high withstand voltage relays in the charging/discharging circuits, in the case of accumulating the electric charge and of discharging as the series connection, high voltage current does not pass through the inside of the changeover switch, and thus the circuit can avoid the damage of the changeover switch due to the high voltage current.

Effect of the Invention

According to the present invention as described above, the following effects can be achieved.

(1) The existing capacitor product and the like can be used, and the insulator film coating treatment of the anode electrode plate and the rotation of the cathode electrode plate in the electrolyte solution and the like become unnecessary.

(2) By installing the operation switch, operation in the first mode of the capacitor circuit is newly added, the circuit ensures the operation in the first mode and the second mode, and the operation mode can be selected.

(3) Since the changeover switch can be actuated by any energy source and with an extremely small driving force, the device can be simplified, downsized, and enhance the efficiency.

(4) By installing high withstand voltage relays in the capacitor circuit, in the case where one capacitor and the other capacitor accumulates the electric charge and where the capacitors are connected in series to supply the increased electric charge to the discharging circuit, the electric current does not need to pass through the inside of the changeover switch. Therefore, the damage of the changeover switch due to high voltage or the like can be prevented, and the device can ensure the stable operation.

This power generation device does not use any fossil fuel, nuclear fuel, or the like at the time of power generation. Therefore, the power generation device is an extremely clean, safe, and highly efficient that does not discharge any harmful substances such as carbon dioxide and radioactive substances.

In addition, there are no negative factors such as instability of power generation output, vast site, high power generation cost, noise, impairing scenery, and the like which are characteristics of solar power generation, wind power generation, and the like.

BEST MODE FOR CARRYING OUT THE INVENTION

Figure 1:
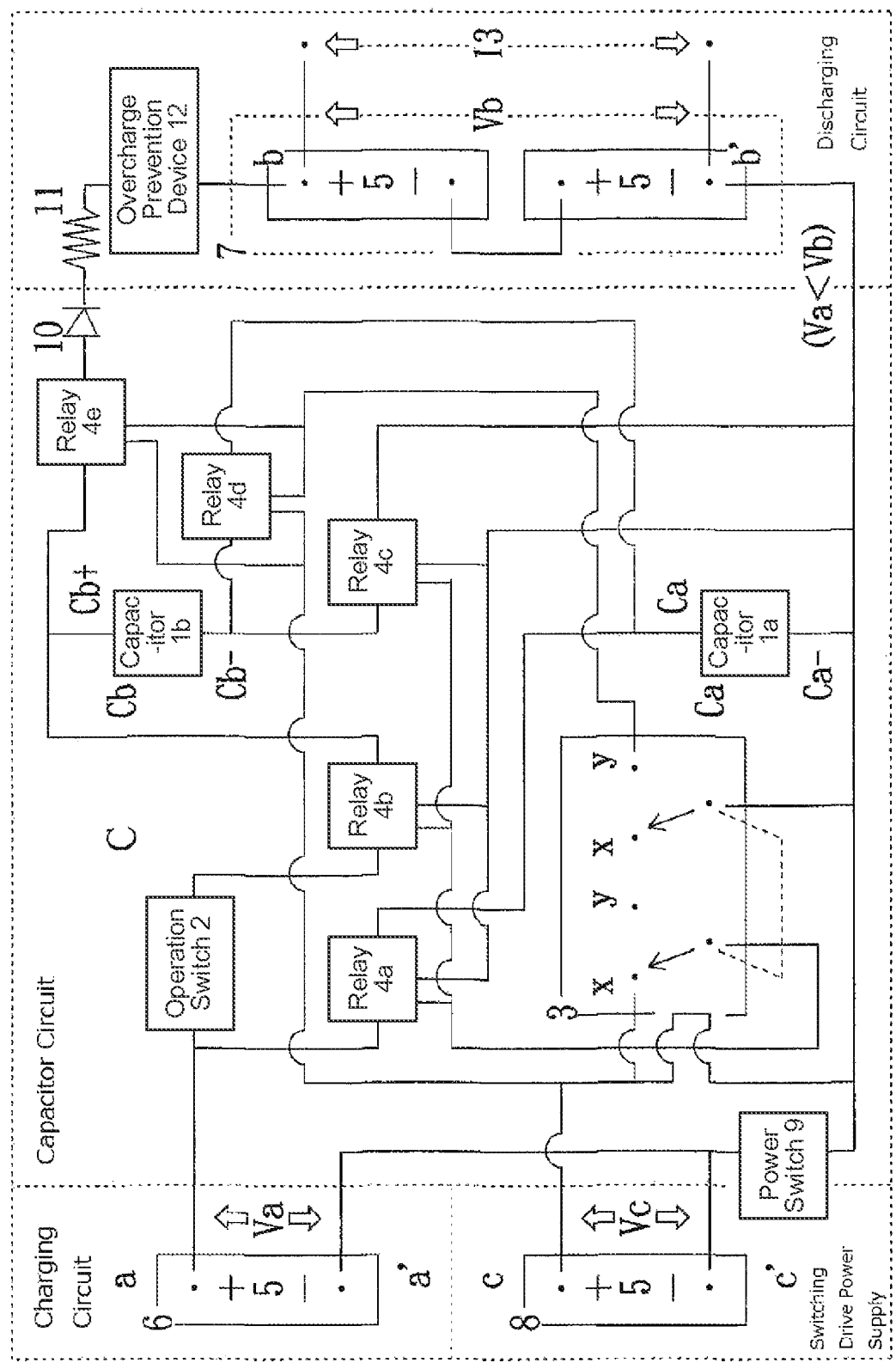
FIG. 1 is a circuit configuration diagram in one example of a power generation device according to the present invention.

Hereinafter, examples of the power generation device of the present invention will be described with reference to an accompanying drawing (FIG. 1).

(1) One capacitor Ca is comprised of one or more capacitors 1. Similarly, the other capacitor Cb is comprised of one or more capacitors 1.

(2) The circuit of one capacitor Ca and the other capacitor Cb is configured as a capacitor circuit C, and the component ratio for the capacitance of one capacitor Ca to that of the other capacitor Cb is set to 2:1.

(3) The capacitor circuit C is provided with an operation switch 2 for switching the mode of the circuit, an interlocking changeover switch 3, and high withstand voltage relays 4.

(4) A first DC power supply 6 (charge voltage Va) comprised of a DC power supply 5 is connected between an input terminal a and an input terminal a'.

(5) A second DC power supply 7 (discharge voltage Vb) comprised of a DC power supply 5 and of which the voltage is twice as high as that of the first DC power supply 6 is connected between an output terminal b and an output terminal b'.

(6) A switching drive power supply 8 (drive voltage Vc) comprised of a DC power supply 5 is connected between an input terminal c and an input terminal c' to actuate the interlocking changeover switch 3.

(7) A power supply switch 9 is provided in the capacitor circuit C.

(8) The capacitor 1 and the DC power source 5 can use any type of electrostatic capacitors and power storage devices besides existing product of capacitors and storage batteries and the like.

(9) The operation switch 2 is turned "ON" to set the circuit to a first mode. Then, the power switch 9 is turned "ON".

(10) When the changeover switch 3 is switched to a x-side, three sets of relays 4a, 4b, 4c are activated in response to the control signal from the changeover switch 3. Thus, one capacitor Ca and the other capacitor Cb of the capacitor circuit C are connected in parallel, both capacitor anode sides Ca+ and Cb+ are connected to the input terminal a of the first DC power supply 6, both capacitor cathode sides Ca− and Cb− are connected to the input terminal a', and therefore, a charging circuit is formed.

(11) At this time, electric charges are accumulated in both capacitors Ca and Cb of the capacitor circuit C by the applied voltage of the first DC power supply 6 via the three relays 4a, 4b, and 4c, respectively.

(12) Then, when the changeover switch 3 is switched to a y-side, two sets of relays 4d and 4e are activated in response to the control signal from the changeover switch 3. Thus, both capacitors Ca and Cb of the capacitor circuit C accumulating the electric charge are connected in series, the other capacitor anode Cb+ side is connected to the output terminal b of the second DC power supply 7, one capacitor cathode Ca− side is connected to the output terminal b', and therefore, a discharging circuit is formed.

(13) When one capacitor Ca and the other capacitor Cb of the capacitor circuit C are connected in series, the combined capacitance Cab of the capacitor circuit C decreases.

At this time, since the electric charge of the capacitor circuit C is constant, the voltage across the both ends becomes higher than the voltage applied to the second DC power supply 7, and the electric charge of the capacitor circuit C is supplied to the second DC power supply 7 side via the two relays 4d and 4e. Therefore, electric energy can be obtained.

(14) For this reason, when the electric charge is accumulated in the capacitor circuit C and also when the electric charge is supplied to the discharging circuit, the current for the accumulation and supply does not flow within the changeover switch 3.

(15) The changeover switch 3 is switched after the time necessary and sufficient for charging and discharging the capacitor circuit C has elapsed. The changeover switch 3 can also use a solid state relay or the like.

(16) The discharging circuit is provided with a reverse blocking diode 10, a resistor 11 for limiting the discharge current to the second DC power supply 7, and an overcharge prevention device 12 for preventing the overcharge.

(17) A load 13 is connected between the output terminals b and b'.

Figure 2:
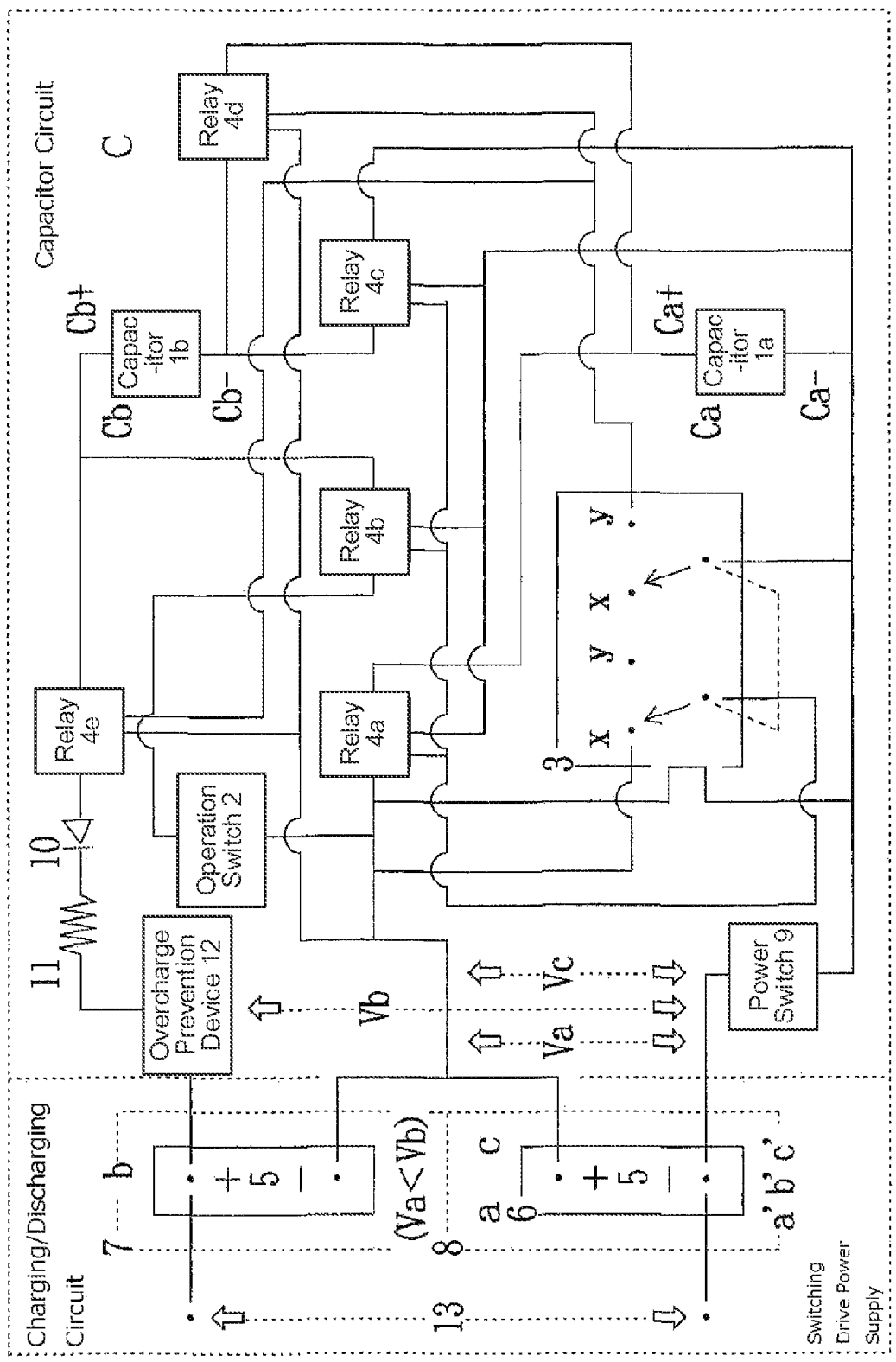
FIG. 2 is a circuit configuration diagram in the other example of the power generation device according to the present invention.

(18) As shown in FIG. 2, it is also possible to supply part of the power from the second DC power supply 7 to the first DC power supply 6 and the switching drive power supply 8.

As described above, the power generation device is configured.

Even when the operation switch 2 is turned "OFF" to set the circuit to a second mode, electric energy can similarly be obtained on the second DC power supply 7 side.

Figure 3:
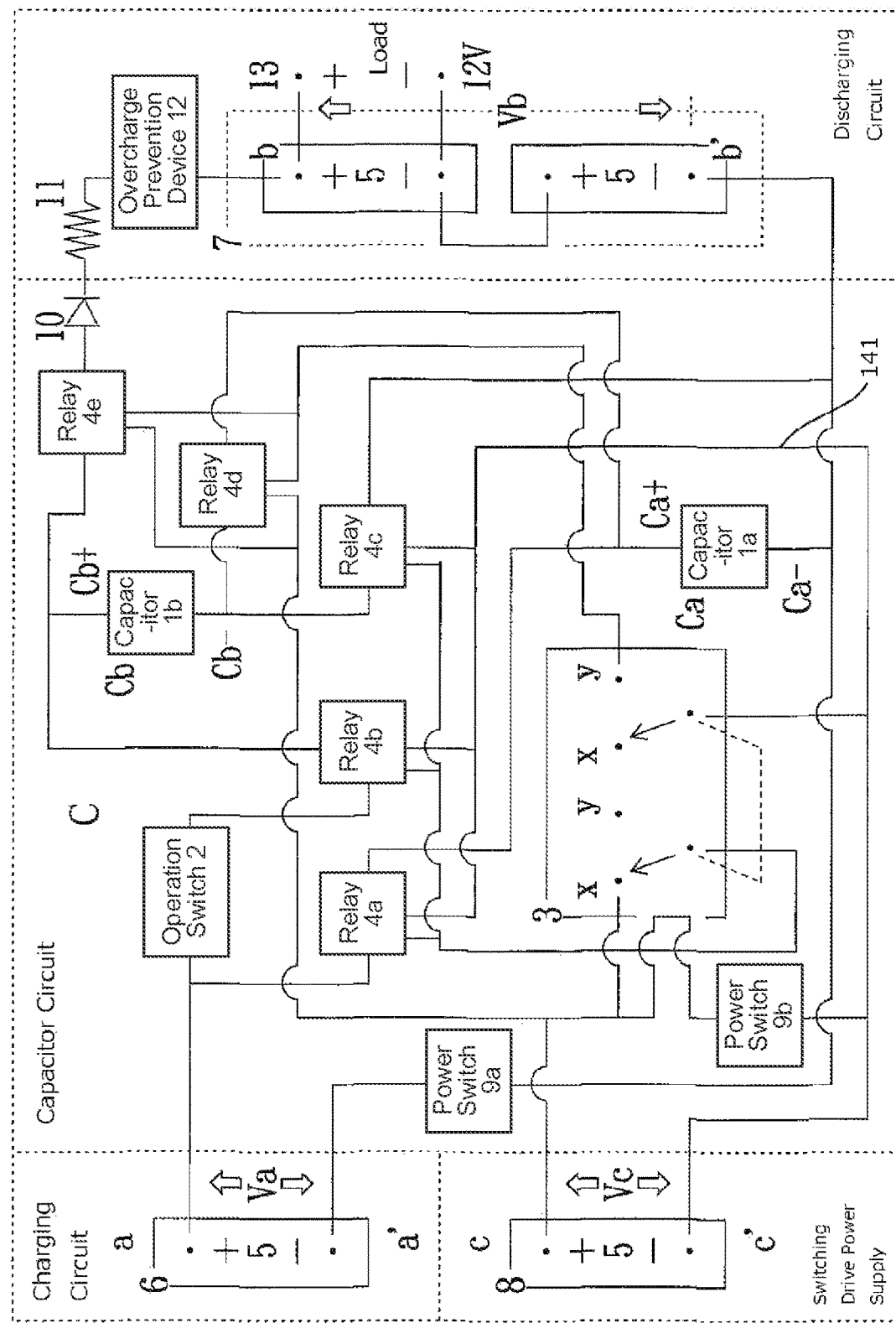
FIG. 3 is a circuit configuration diagram in a modification of the example of FIG. 1.
Figure 4:
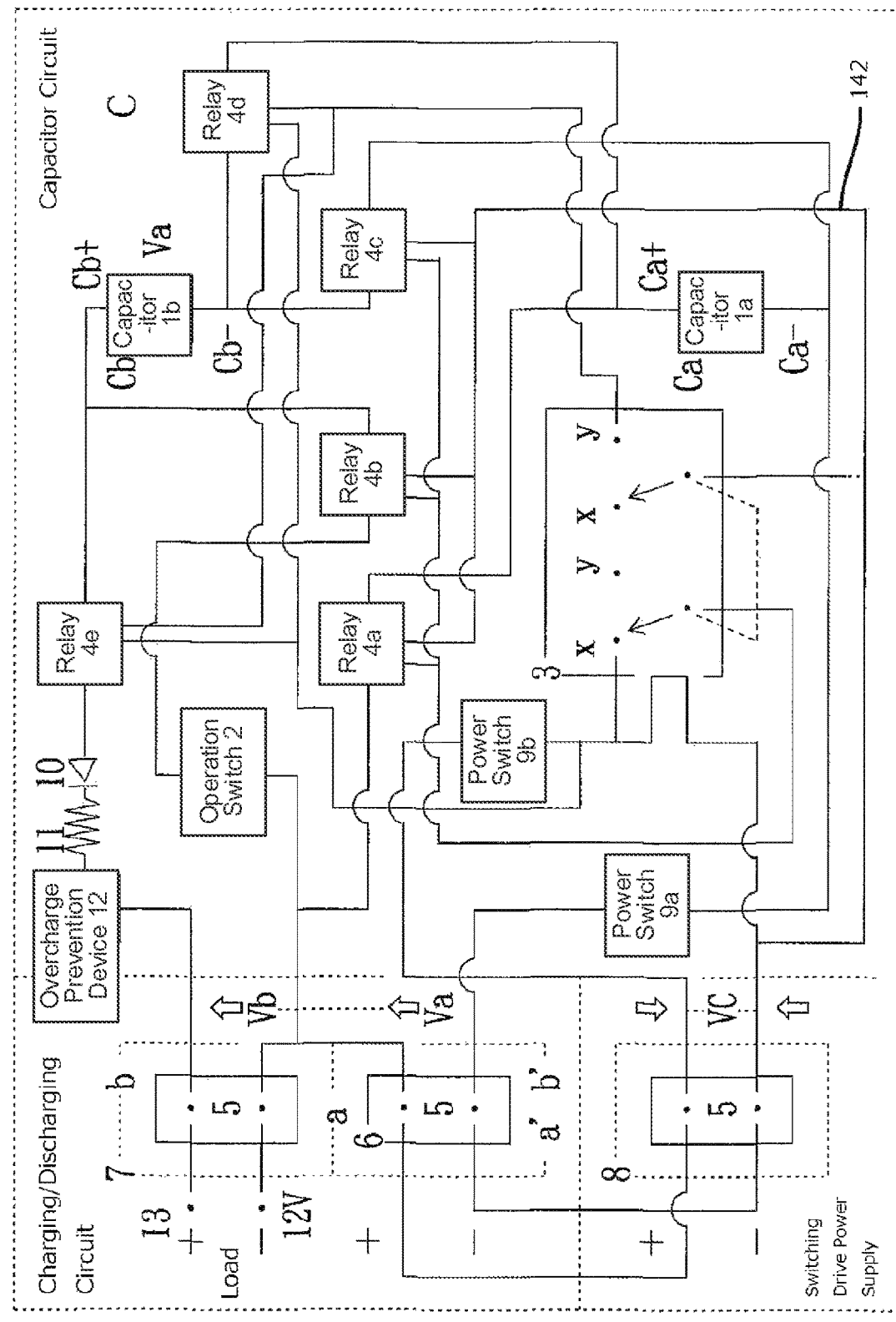
FIG. 4 is a circuit configuration diagram in the modification of the example of FIG. 2.

Note that, in each of the modifications in FIG. 3 and FIG. 4, a first auxiliary line 141 and a second auxiliary line 142 are provided within the circuit, thereby more reliably protecting the switches and the relays for the charging/discharging circuit.

Moreover, as the external energy for reducing the capacitance of capacitors, the electric energy can also be utilized besides the natural energy, such as waves and sunlight.

While the means and examples for solving the problems of the present invention have been described above, the scope of the present invention is not limited thereto. For example, as for the capacitance of the capacitor, the design of the capacitor capacitance, ratio, a mode of the connection structure, the method of accumulating the electric charge, the configuration of the power supply, the component ratio of the voltage, and the like, these are appropriately selected depending on the situation.

INDUSTRIAL APPLICABILITY

The power generation device according to the present invention enables an improvement in the power generation efficiency, downsizing, decentralization, and the like, and also enables installation on a movable body such as an automobile. The industrial applicability of the present invention is very high as with various other power generation devices.

DESCRIPTION OF REFERENCE NUMERALS AND SYMBOLS

1: capacitor
2: operation switch
3: changeover switch
4: relays (4a, 4b, 4c, 4d, 4e)
5: direct-current (DC) power supply
6: first DC power supply
7: second DC power supply
8: switching drive power supply
9: power switch
10: reverse blocking diode
11: resistor
12: overcharge prevention device
13: load
141: first auxiliary line
142: second auxiliary line
a, a': input terminal
b, b': output terminal
c, c': input terminal
C: capacitor circuit
Ca: one capacitor
Ca+: one capacitor anode
Ca−: one capacitor cathode
Cb: the other capacitor
Cb+: the other capacitor anode
Cb−: the other capacitor cathode
Va: charge voltage
Vb: discharge voltage
Vc: drive voltage
x: changeover switch x-side
y: changeover switch y-side

The invention claimed is:

1. A power generation device, comprising:
(a) a capacitor circuit as a circuit for connecting two capacitors that are first and second capacitors, each of which comprising at least one capacitor wherein the first and second capacitors are connected with at least two paths wherein, in one path, the first and second capacitors are in series and, in the other path, the first and second capacitors are in parallel;
(c) a changeover switch provided in the capacitor circuit, switching between x-side and y-side,
(d) a first DC power supply comprising a DC power supply for supplying first voltage (Va) in the capacitor circuit, a second DC power supply for supplying second voltage (Vb) and reserving electric charge from the capacitor circuit; and
a switching drive power supply comprising a DC power supply for supplying switching voltage (Vc) in the capacitor circuit,
(f) a first relay group and a second relay group each of which comprises at least one relay such that the first and second relay groups independently take either ON state for current running or OFF state for current not running wherein the first relay group is disposed in a circuit in which the first and second capacitors are in parallel and connected to the first DC power, and the second relay group is disposed on another circuit in which the first and second capacitors are in series and connected to the second DC power supply;

wherein,
(g) when the changeover switch takes the x-side, the first relay group turns to the ON state with the switching voltage (Vc) and the second relay group turns to the OFF state such that the first DC power supply
is electrically connected to the first and second capacitors via the first relay group and
accumulates electric charge in the first and second capacitors with the first voltage (Va) in accordance with a first combined capacitance of the first and second capacitors arranged in parallel;
(i) when the changeover switch takes the y-side after accumulating the electric charge in the first and second capacitors by taking the x-side, the second relay group turns to the ON state with the switching voltage (Vc) and the first relay group turns to the OFF state such that the first and second capacitors are electrically connected to the second DC power supply via the second relay group, whereby a second combined capacitance of the first and second capacitors arranged in series becomes lower than the first combined capacitance, an excess amount of the electric charge, which corresponds to a difference between the first and second combined capacitances, is discharged to the second DC power supply via the second relay group to obtain electric energy.

2. The power generation device according to claim 1, wherein
the second voltage (Vb) of the second DC power supply is set higher than the first voltage (Va) of the first DC power supply and a capacitance of the first capacitor is set larger than a capacitance of the second capacitor.

3. The power generation device according to claim 2, wherein
the changeover switch repeats a side change between the x-side and the y-side.

4. A power generation device, comprising:
(a) a capacitor circuit as a circuit for connecting two capacitors that are first and second capacitors, each of which comprising at least one capacitor wherein the first and second capacitors are connected with at least two paths wherein, in one path, the first and second capacitors are in parallel and, in the other path, the first and second capacitors are in series;
(b) an operation switch capable of selectively charging the one capacitor and the other capacitor provided in the capacitor circuit, wherein a structure of the capacitor circuit can be changed to a first mode in which the operation switch is turned "ON" to accumulate electric charge in both the one and the other capacitors, and a second mode in which the operation switch is turned "OFF" to accumulate electric charge in only the one capacitor;
(c) a changeover switch provided in the capacitor circuit, switching between x-side and y-side,
(d) a first DC power supply comprising a DC power supply for supplying first voltage (Va) in the capacitor circuit, a second DC power supply for supplying second voltage (Vb) and reserving increased electric charge from the capacitor circuit; and
a switching drive power supply comprising a DC power supply for supplying switching voltage (Vc) in the capacitor circuit,
(f) a first relay group and a second relay group each of which comprises at least one relay such that the first and second relay groups independently take either ON state for current running or OFF state for current not running wherein the first relay group is disposed in a circuit in which the first and second capacitors are in parallel and connected to the first DC power supply, and the second relay group is disposed on another circuit in which the first and second capacitors are in series and connected to the second DC power supply; wherein, (g) when the changeover switch takes the x-side, the first relay group turns to the ON state with the switching voltage (Vc) and the second relay group turns to the OFF state such that the first DC power supply
- is electrically connected to the first and second capacitors via the first relay group and
- accumulates electric charge in the first and second capacitors with the first voltage (Va) in accordance with a first combined capacitance of the first and second capacitors arranged in parallel;

(i) when the changeover switch takes the y-side after accumulating the electric charge in the first and second capacitors by taking the x-side, the second relay group turns to the ON state with the switching voltage (Vc) and the first relay group turns to the OFF state such that the first and second capacitors are electrically connected to the second DC power supply via the second relay group, whereby a second combined capacitance of the first and second capacitors arranged in series becomes lower than the first combined capacitance, an excess amount of the electric charge, which corresponds to a difference between the first and second combined capacitances, is discharged to the second DC power supply via the second relay group to obtain electric energy.

5. The power generation device according to claim 4, wherein
the second voltage (Vb) of the second DC power supply is set higher than the first voltage (Va) of the first DC power supply and a capacitance of the first capacitor is set larger than a capacitance of the second capacitor.

6. The power generation device according to claim 5, wherein
the changeover switch repeats a side change between the x-side and the y-side.

* * * * *